US009982624B1

(12) United States Patent
Kang et al.

(10) Patent No.: US 9,982,624 B1
(45) Date of Patent: May 29, 2018

(54) VARIABLE SECOND INJECTION CONTROL FOR INTERNAL COMBUSTION ENGINE ASSEMBLIES

(71) Applicant: GM GLOBAL TECHNOLOGY OPERATIONS LLC, Detroit, MI (US)

(72) Inventors: Jun-Mo Kang, Ann Arbor, MI (US); Hanho Yun, Oakland Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days. days.

(21) Appl. No.: 15/410,039

(22) Filed: Jan. 19, 2017

(51) Int. Cl.
| | | |
|---|---|---|
| *F02D 41/30* | (2006.01) | |
| *F02D 41/40* | (2006.01) | |
| *F02D 41/04* | (2006.01) | |
| *F02D 41/00* | (2006.01) | |
| *F02D 41/14* | (2006.01) | |
| *F02M 35/10* | (2006.01) | |

(52) U.S. Cl.
CPC ....... *F02D 41/402* (2013.01); *F02D 41/0047* (2013.01); *F02D 41/04* (2013.01); *F02D 41/1454* (2013.01); *F02M 35/1038* (2013.01)

(58) Field of Classification Search
CPC ............... F02D 41/402; F02D 41/1454; F02D 41/0047; F02D 41/04; F02D 41/0052; F02D 41/0072
USPC ..... 123/299, 300, 568.21; 701/103–105, 108
See application file for complete search history.

(56) References Cited

U.S. PATENT DOCUMENTS

| | | | |
|---|---|---|---|
| 6,994,072 B2 | 2/2006 | Kuo et al. | |
| 7,128,047 B2 | 10/2006 | Kuo et al. | |
| 7,367,313 B2 | 5/2008 | Chang et al. | |
| 7,689,343 B2 | 3/2010 | Dagci et al. | |
| 7,725,244 B2 * | 5/2010 | Itoga ................... | F02D 41/0057 701/108 |
| 8,210,158 B2 | 7/2012 | Kang et al. | |
| 8,316,818 B2 | 11/2012 | Ramappan et al. | |
| 8,347,860 B2 | 1/2013 | Kang et al. | |
| 2010/0294232 A1 | 11/2010 | Otterstrom | |
| 2013/0080026 A1 | 3/2013 | Kang et al. | |
| 2016/0258410 A1 * | 9/2016 | Cygan, Jr. ............... | F02P 5/145 |

* cited by examiner

*Primary Examiner* — Hai Huynh
(74) *Attorney, Agent, or Firm* — Quinn IP Law (57) ABSTRACT

Disclosed are multi-pulse fuel delivery control systems, methods for using such systems, and motor vehicles with engines employing multi-pulse fuel injection schemes. A fuel delivery control system is disclosed with fuel injectors that selectively inject multiple pulses of fuel per working cycle into cylinders of an engine. An engine sensor detects an operating condition of the engine, and an exhaust gas recirculation (EGR) sensor detects a state of an EGR system coupled to the engine. An engine control unit is programmed to: determine, from the detected EGR state, a current intake burned gas fraction; determine, from the detected engine operating condition, a desired intake burned gas fraction; determine a secondary fuel mass injection adjustment based on the desired and current intake burned gas fractions; and command the fuel injectors to inject two fuel pulses into each cylinder per working cycle, with the second pulse modified based on the determined adjustment.

20 Claims, 4 Drawing Sheets

VARIABLE SECOND INJECTION CONTROL FOR INTERNAL COMBUSTION ENGINE ASSEMBLIES

INTRODUCTION

The present disclosure relates generally to internal combustion engine (ICE) assemblies. More specifically, aspects of this disclosure relate to fuel injection operation and control strategies for reciprocating-piston type internal combustion engines.

Current production motor vehicles, such as the modern-day automobile, are originally equipped with a powertrain that operates to propel the vehicle and power the onboard vehicle electronics. The powertrain, which is inclusive of and oftentimes misclassified as a drivetrain, is generally comprised of a prime mover that delivers driving power to the vehicle's final drive system (e.g., rear differential, axle, and wheels) through a multi-speed power transmission. Automobiles have been powered by a reciprocating-piston type internal combustion engine (ICE) because of its ready availability and relatively inexpensive cost, light weight, and overall efficiency. Such engines include two and four-stroke compression-ignited diesel engines, four-stroke spark-ignited gasoline engines, six-stroke architectures, and rotary engines, as some non-limiting examples. Hybrid vehicles, on the other hand, utilize alternative power sources, such as battery powered electric motor-generators, to propel the vehicle, minimizing reliance on the engine for power and increasing overall fuel economy.

A typical overhead valve internal combustion engine includes an engine block with cylinder bores each having a piston reciprocally movable therein. Coupled to a top surface of the engine block is a cylinder head that cooperates with the piston and cylinder bore to form a variable-volume combustion chamber. These reciprocating pistons are used to convert pressure, generated by igniting a fuel-and-air mixture in the combustion chamber, into rotational forces to drive a crankshaft. The cylinder head defines intake ports through which air, provided by an intake manifold, is selectively introduced to each combustion chamber. Also defined in the cylinder head are exhaust ports through which exhaust gases and byproducts of combustion are selectively evacuated from a combustion chamber to an exhaust manifold. The exhaust manifold, in turn, collects and combines the exhaust gases for recirculation into the intake manifold, delivery to a turbine-driven turbocharger, or evacuation from the ICE via an exhaust system.

A cylinder head (or heads, if the engine has multiple banks of cylinders) may be designed to house the ICE's valve train, which may include inlet valves, exhaust valves, rocker arms, pushrods, and, in some instances, one or more camshafts. The valve train is part of the powertrain subsystem responsible for controlling the amount of fuel-entrained air and exhaust gas entering and exiting the engine's combustion chambers at any given point in time. Engine torque and power output is varied by modulating valve lift and timing, which is accomplished by driving the inlet and exhaust valves, either directly or indirectly, by cam lobes on a rotating camshaft. Different engine speeds typically require different valve timing and lift for optimum performance. Generally, low engine speeds require valves to open a relatively small amount over a shorter duration, while high engine speeds require valves to open a relatively larger amount over a longer duration for optimum performance.

Four-stroke spark-ignition (SI) engines operate—as the name suggests—in four distinct stages or "strokes" to drive the engine's crankshaft. At one such (first) stage of operation, known as the "intake stroke," a pressurized mixture of fuel and air is introduced into each cylinder as the corresponding piston travels rectilinearly from top-to-bottom along the length of the cylinder bore. Valve train intake valves are opened such that a vacuum pressure gradient generated by the downward-travelling piston draws fuel and air into the combustion chamber. During a subsequent (second) stage, known as the "compression stroke," the intake and exhaust valves are closed as the piston travels from bottom-to-top and compresses the fuel-air mixture. Upon completion of the compression stroke, another (third) stage or "power stroke" commences and a spark plug ignites the compressed fuel and air, with the resultant explosive expansion of gases pushing the piston back to bottom dead center (BDC). During a successive stage—most commonly known as the "exhaust stroke"—the piston once again returns to top dead center (TDC) with the exhaust valves open; the travelling piston expels the spent air-fuel mixture from the combustion chamber. The four strokes of a single working (Otto) cycle requires two revolutions of the crankshaft to complete.

Many spark-ignition engines inject a single pulse of pressurized fuel-air mixture into the combustion chamber and, following the subsequent compression stroke, ignite the condensed fluid mixture while the piston is at top dead center of the piston stroke. Fuel injection pulse modulation may be optimized to produce different combustion characteristics and, thus, improved engine performance. Some gasoline fueled, direct-injection SI engines employ electrically-actuated fuel injectors to deliver multiple consecutive fuel pulses per single combustion event to vary cylinder charge composition and temperature. In such multi-pulse delivery control systems, variation of the injector current profiles—and thus the fuel pulse profiles—of consecutive fuel pulses in a single combustion chamber may provide more precise control of the overall fuel delivery. This, in turn, may help to meet more stringent vehicle emission and fuel economy requirements. Multi-pulse fuel delivery may also be utilized to produce rapid catalytic light-off and to provide a lean homogeneous fuel mixture.

SUMMARY

Disclosed herein are multi-pulse fuel delivery control systems for internal combustion engine (ICE) assemblies, methods for using such fuel delivery control systems, spark-ignited internal combustion engines having multi-pulse fuel delivery capabilities, methods for operating such engines, and motor vehicle equipped with such engines. By way of example, and not limitation, there is presented a novel variable second injection control strategy for auto-ignition and/or spark-ignition ICE assemblies. Embodied, for example, as a control algorithm composed of processor-executable instructions effectuated by an onboard engine controller of an automobile, the strategy adjusts multiple-injection mass (e.g., volume and/or timing of a second fuel pulse injection) in real-time based, for example, on current vehicle operating conditions via real-time sensors, such as intake O2 sensors, Wide Range Air Fuel (WRAF) sensors, fuel charge temperature sensors, embedded engine acoustic sensors, etc. When cylinder charge temperature is determined to be above a predetermined threshold, a second injection may be modulated to cool down the cylinder charge, which helps to slow down auto-ignition and, thus, reduce combustion noise. Conversely, when cylinder charge temperature is determined to be below a predetermined minimum, which may result in sporadic auto-ignition, a second injection may be modulated to stabilize combustion, for example, by initiating spark-assisted auto-ignition. Second injection volume and/or timing may be adjusted, for example, during engine transients (e.g., acceleration and deceleration) to improve combustion stability and temper engine noise responsive to monitored engine operating conditions.

Attendant benefits for at least some of the disclosed concepts include multi-pulse fuel delivery control methodologies that decrease burst combustion noise during rapid transient operation of auto-ignition engine architectures and other spark-ignition (SI) engine architectures. Direct-injection SI engines are disclosed with multi-pulse fuel delivery capabilities providing silent load transient operation without significant performance degradation. Aspects of the disclosed concepts also help to minimize burst combustion noise due to exhaust gas recirculation (EGR) delay and, concomitantly, quiet engine operation. Adjusting second injection volume in real-time, responsive to current engine and vehicle operating conditions via real-time sensors, may help to control spark-assisted auto-ignition and stabilize combustion during each respective cycle or series of consecutive cycles in internal combustion engines.

Aspects of the present disclosure are directed to multi-pulse fuel delivery control systems for direct-injection, spark-ignition internal combustion engine assemblies with EGR functionality. Disclosed, for example, is a fuel delivery control system for an ICE assembly, which includes an exhaust gas recirculation (EGR) system and multiple cylinders each with a respective piston. This fuel delivery control system includes a plurality of fuel injectors that fluidly couple to the ICE assembly. Each fuel injector is operable, when activated, to inject multiple pulses of fuel, per working cycle, into one of the ICE assembly's cylinders. An engine sensor detects a current engine operating condition of the ICE assembly, and outputs signals indicative thereof, while an EGR sensor detects a current EGR state of the EGR system, and outputs signals indicative thereof. A programmable engine control unit, which is communicatively connected to the fuel injectors, the EGR sensor, and the engine sensor, is operable to: determine, from a signal received from the EGR sensor indicative of the current EGR state, a current intake burned gas fraction; determine, from a signal received from the engine sensor indicative of the current engine operating condition, a desired intake burned gas fraction; determine a secondary fuel mass injection adjustment based on a difference between the desired and the current intake burned gas fraction; and command each fuel injector to inject at least two fuel pulses into its respective cylinder, per working cycle, with the second fuel pulse modified based on the secondary fuel mass injection adjustment.

Other aspects of the present disclosure are directed to motor vehicles with reciprocating-piston-type spark-ignition engine assemblies with multi-pulse fuel injection capabilities. A "motor vehicle," as used herein, may include any relevant vehicle platform, such as passenger vehicles (internal combustion engine (ICE), hybrid, fuel cell, fully or partially autonomous, etc.), commercial vehicles, industrial vehicles, tracked vehicles, off-road and all-terrain vehicles (ATV), farm equipment, boats, airplanes, etc. In an example, a motor vehicle is presented that includes a vehicle body with an engine compartment, and an internal combustion engine assembly mounted inside the engine compartment. The ICE assembly includes an engine block with one or more cylinder banks defining cylinder bores. A piston is reciprocally movable within each one of the cylinder bores. Assorted engine valves are operable to regulate fluid intake and exhaust for the cylinder bores. Fuel injectors, when activated, operate to inject multiple pulses of fuel, per working cycle, into each of the cylinder bores.

An exhaust gar recirculation (EGR) system is fluidly coupled to the ICE assembly and configured to recirculate exhaust gases from the ICE assembly back into one or more of the cylinder bores. An engine sensor monitors, in real-time, the current engine operating condition of the ICE assembly, while an EGR sensor monitors, in real-time, the current EGR state of the EGR system. Communicatively connected to the fuel injectors, EGR sensor, and engine sensor is an engine control unit that is programmed to: determine, from a signal received from the EGR sensor indicative of the current EGR state of the EGR system, a current intake burned gas fraction; determine, from a signal received from the engine sensor indicative of a current engine operating condition of the ICE assembly, a desired intake burned gas fraction; calculate a secondary fuel mass injection adjustment based on a difference between the desired and the current intake burned gas fraction multiplied by an engine beta parameter and bounded by predetermined upper and lower thresholds; and command each fuel injector to inject a second fuel pulse, in addition to a first fuel pulse, into a respective cylinder, per ignition cycle, with the second fuel pulse increased or decreased by the secondary fuel mass injection adjustment.

Additional aspects of this disclosure are directed to methods of making and methods of using multi-pulse fuel delivery control systems for direct-injection, spark-ignition ICE assemblies with EGR functionality. For instance, a method is disclosed for operating a fuel delivery control system for an ICE assembly. The method includes, in any order and in any combination: determining, via a signal received from an EGR sensor indicative of a current EGR state of the EGR system, a current intake burned gas fraction; determining, via a signal received from an engine sensor indicative of a current engine operating condition of the ICE assembly, a desired intake burned gas fraction; determining a secondary fuel mass injection adjustment based on a difference between the desired intake burned gas fraction and the current intake burned gas fraction; and commanding each of the fuel injectors to inject two consecutive fuel pulses into their respective cylinder per ignition cycle with the second pulse modified by the secondary fuel mass injection adjustment. The method may further comprise determining an engine beta parameter for the ICE assembly, and basing the secondary fuel mass injection adjustment on the engine beta parameter. The secondary fuel mass injection adjustment may be bounded by a minimum of a predetermined maximum fuel mass injection and a desired fuel intake. The current engine operating condition may be the current engine speed, the current engine load, the current engine acceleration, the current engine ringing index, or any combination thereof, measured in real-time. Desired intake burned gas fraction may be identified by referencing a lookup chart stored on a memory device.

The above summary is not intended to represent every embodiment or every aspect of the present disclosure. Rather, the foregoing summary merely provides an exemplification of some of the novel aspects and features set forth herein. The above features and advantages, and other features and advantages of the present disclosure, will be readily apparent from the following detailed description of representative embodiments and representative modes for carrying out the present disclosure when taken in connection with the accompanying drawings and the appended claims. Moreover, this disclosure expressly includes any and all combinations and subcombinations of the elements and features presented above and below.

The present disclosure is susceptible to various modifications and alternative forms, and some representative embodiments have been shown by way of example in the drawings and will be described in detail herein. It should be understood, however, that the novel aspects of this disclosure are not limited to the particular forms illustrated in the appended drawings. Rather, the disclosure is to cover all modifications, equivalents, combinations, subcombinations, permutations, groupings, and alternatives falling within the scope and spirit of the disclosure as defined by the appended claims.

DETAILED DESCRIPTION OF THE ILLUSTRATED EMBODIMENTS

This disclosure is susceptible of embodiment in many different forms. There are shown in the drawings and will herein be described in detail representative embodiments of the disclosure with the understanding that the present disclosure is to be considered as an exemplification of the principles of the disclosure and is not intended to limit the broad aspects of the disclosure to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all" means "any and all"; the word "any" means "any and all"; and the words "including" and "comprising" and "having" mean "including without limitation." Moreover, words of approximation, such as "about," "almost," "substantially," "approximately," and the like, may be used herein in the sense of "at, near, or nearly at," or "within 3-5% of," or "within acceptable manufacturing tolerances," or any logical combination thereof, for example.

Figure 1:
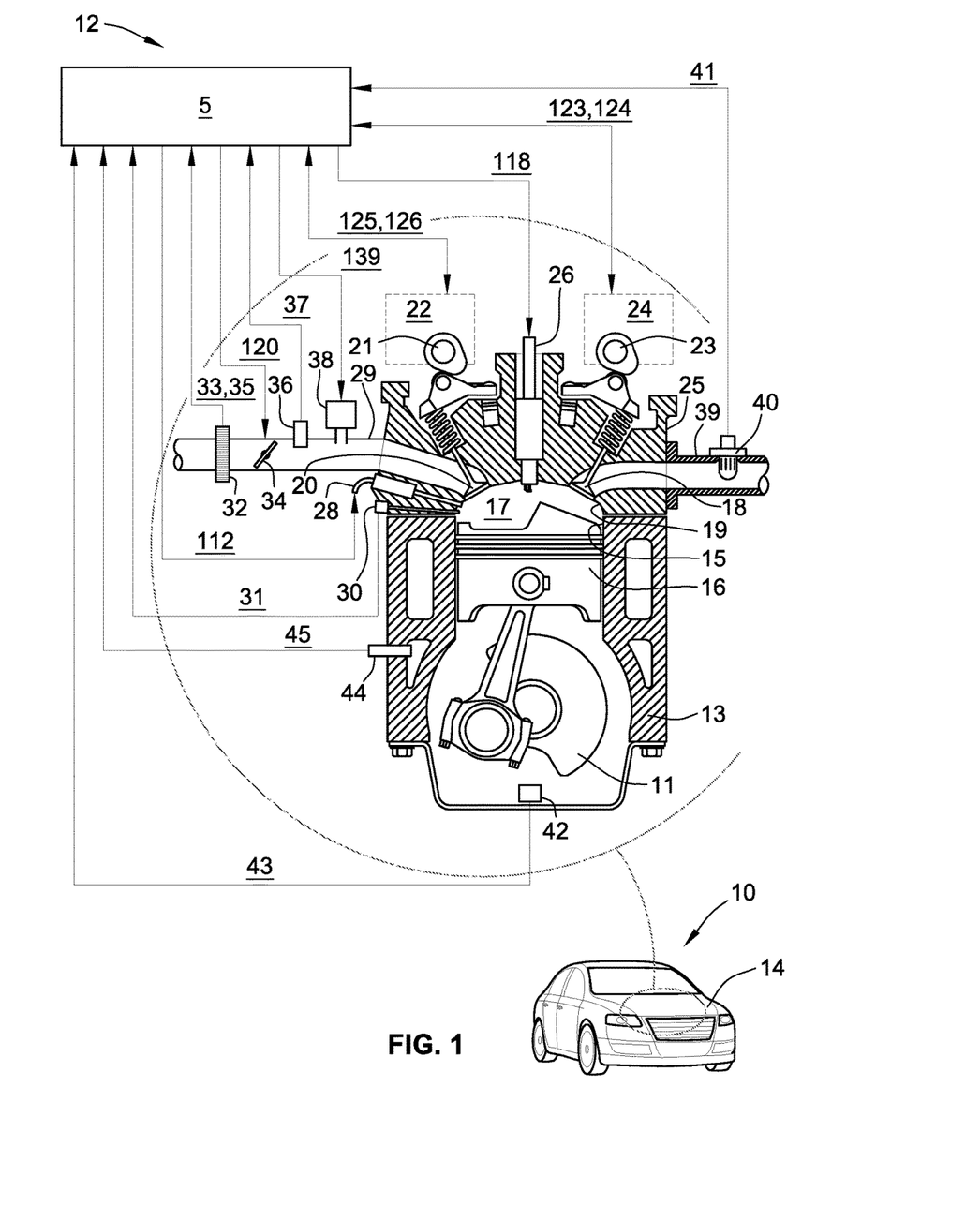
FIG. 1 is a front perspective-view illustration of a representative motor vehicle with an inset schematic illustration of a representative spark-ignited reciprocating-piston type internal combustion engine (ICE) assembly with multi-pulse fuel delivery capabilities in accordance with aspects of the present disclosure.

Referring now to the drawings, wherein like reference numbers refer to like features throughout the several views, there is shown in FIG. 1 a perspective-view illustration of a representative automobile, which is designated generally at 10 and portrayed herein for purposes of discussion as a four-door sedan-style passenger vehicle. Mounted at a forward portion of the automobile 10, e.g., aft of a front bumper fascia and grille and forward of a passenger compartment, is an internal combustion engine (ICE) assembly 12 housed within an engine compartment covered by an engine hood 14. The illustrated automobile 10—also referred to herein as "motor vehicle" or "vehicle" for short—is merely an exemplary application with which the novel aspects and features of this disclosure may be practiced. In the same vein, the implementation of the present concepts into a spark ignited direct injection (SIDI) engine configuration should also be appreciated as an exemplary application of the novel concepts disclosed herein. As such, it will be understood that the aspects and features of the present disclosure may be applied to other engine architectures and utilized for any logically relevant type of motor vehicle. Lastly, the drawings presented herein are not necessarily to scale and are provided purely for instructional purposes. Thus, the specific and relative dimensions shown in the drawings are not to be construed as limiting.

There is shown in FIG. 1 an example of a multi-cylinder, dual overhead cam (DOHC), inline-type ICE assembly 12. The illustrated ICE assembly 12 is a four-stroke reciprocating-piston engine configuration that operates to propel the vehicle 10, for example, as a direct injection gasoline engine, including flexible-fuel vehicle (FFV) and hybrid vehicle variations thereof. The ICE assembly 12 may optionally operate in any of an assortment of selectable combustion modes, including a homogeneous-charge compression-ignition (HCCI) combustion mode and a spark-ignition (SI) combustion mode. Additionally, the ICE assembly 12 may operate at a stoichiometric air/fuel ratio and/or at an air/fuel ratio that is primarily lean of stoichiometry. This engine 12 includes a series of reciprocating pistons 16 slidably movable in cylinder bores 15 of an engine block 13. The top surface of each piston 16 cooperates with the inner periphery of its corresponding cylinder 15 and a chamber surface 19 of a cylinder head 25 to define a variable volume combustion chambers 17. Each piston 16 is connected to a rotating crankshaft 11 by which linear reciprocating motion of the pistons 16 is output, for example, to a power transmission (not shown) as rotational motion via the crankshaft 11.

An air intake system transmits intake air to the cylinders 15 through an intake manifold 29, which directs and distributes air into the combustion chambers 17 via intake runners of the cylinder head 25. The engine's air intake system has airflow ductwork and various electronic devices for monitoring and controlling the air flow. The air intake devices may include, as a non-limiting example, a mass airflow sensor 32 for monitoring mass airflow (MAF) 33 and intake air temperature (IAT) 35. A throttle valve 34 controls airflow to the ICE assembly 12 in response to a control signal (ETC) 120 from a programmable engine control unit (ECU) 5. A pressure sensor 36 in the intake manifold 29 monitors, for instance, manifold absolute pressure (MAP) 37 and barometric pressure. An external flow passage recirculates exhaust gases from engine exhaust to the intake manifold 29, having a control valve in the nature of an exhaust gas recirculation (EGR) valve 38. The programmable engine control unit 5 controls mass flow of exhaust gas to the intake manifold 29 by controlling opening of the EGR valve 38 via EGR command 139. In FIG. 1, the arrows connecting ECU 5 with the various components of the ICE assembly 12 are emblematic of electronic signals or other communication exchanges by which data and/or control commands are transmitted from one component to the other.

Airflow from the intake manifold 29 into the combustion chamber 17 is controlled by one or more intake engine valves 20. Evacuation of exhaust gases out of the combustion chamber 17 to an exhaust manifold 39 is controlled by one or more exhaust engine valves 18. These engine valves 18, 20 are illustrated herein as spring-biased poppet valves; however, other known types of engine valves may be employed. The ICE assembly 12 valve train system is equipped to control and adjust the opening and closing of the intake and exhaust valves 20, 18. According to one example, the activation of the intake and exhaust valves 20 and 18 may be respectively modulated by controlling intake and exhaust variable cam phasing/variable lift control (VCP/VLC) devices 22 and 24. These two VCP/VLC devices 22 and 24 are configured to control and operate an intake camshaft 21 and an exhaust camshaft 23, respectively. The rotations of the intake and exhaust camshafts 21 and 23 are linked to and indexed to rotation of the crankshaft 11, thus linking openings and closings of the intake and exhaust valves 20, 18 to positions of the crankshaft 11 and the pistons 16. The intake VCP/VLC device 22 may be fabricated with a mechanism operative to switch and control valve lift of the intake valve(s) 20 in response to a control signal (iVLC) 125, and variably adjust and control phasing of the intake camshaft 21 for each cylinder 15 in response to a control signal (iVCP) 126. In the same vein, the exhaust VCP/VLC device 24 may include a mechanism operative to variably switch and control valve lift of the exhaust valve(s) 18 in response to a control signal (eVLC) 123, and variably adjust and control phasing of the exhaust camshaft 23 for each cylinder 15 in response to a control signal (eVCP) 124. The VCP/VLC devices 22 and 24 may be actuated using any one of electro-hydraulic, hydraulic, electro-mechanic, and electric control force, in response to the respective control signals eVLC 123, eVCP 124, iVLC 125, and iVCP 126.

With continuing reference to the representative configuration of FIG. 1, ICE assembly 12 employs a direct-injection fuel injection subsystem with multiple high-pressure fuel injectors 28 that directly inject pulses of fuel into the combustion chambers 17. Each cylinder 15 is provided with one or more fuel injectors 28, which activate in response to an injector pulse width command (INJ_PW) 112 from the ECU 5. These fuel injectors 28 are supplied with pressurized fuel by a fuel distribution system. One or more or all of the fuel injectors 28 may be operable, when activated, to inject multiple fuel pulses (e.g., a succession of first, second, third, etc., injections of fuel mass) per working cycle into a corresponding one of the ICE assembly cylinders 15. The ICE assembly 12 employs a spark-ignition subsystem by which fuel-combustion-initiating energy—typically in the nature of an abrupt electrical discharge—is provided via a spark plug 26 for igniting, or assisting in igniting, cylinder charges in each of the combustion chambers 17 in response to a spark command (IGN) 118 from the ECU 5.

The ICE assembly 12 is equipped with various sensing devices for monitoring engine operation, including a crank sensor 42 having an output indicative of crankshaft rotational position, e.g., crank angle and/or speed (RPM) signal 43. A temperature sensor 44 is configured to monitor, for example, one or more engine-related (e.g., coolant, fuel, etc.) temperatures, and output a signal 45 indicative thereof. An in-cylinder combustion sensor 30 is configured to monitor combustion-related variables, such as in-cylinder combustion pressure, charge temperature, fuel mass, air-to-fuel ratio, etc., and output a signal 31 indicative thereof. An exhaust gas sensor 40 is configured to monitor an exhaust-gas related variables, e.g., actual air/fuel ratio (AFR), exhaust burned gas fraction, etc., and output a signal 41 indicative thereof. The combustion pressure and the crankshaft speed may be monitored by the ECU 5, for example, to determine combustion timing, i.e., timing of combustion pressure relative to the crank angle of the crankshaft 11 for each cylinder 15 for each working combustion cycle. It should be appreciated that combustion timing may be determined by other methods. Combustion pressure may be monitored by the ECU 5 to determine an indicated mean effective pressure (IMEP) for each cylinder 15 for each working combustion cycle. The ICE assembly 12 and ECU 5 cooperatively monitor and determine states of IMEP for each of the engine cylinders 15 during each cylinder firing event. Alternatively, other sensing systems, which may comprise virtual sensing capabilities, may be used to monitor states of other combustion parameters within the scope of the disclosure, e.g., ion-sense ignition systems, EGR fractions, and non-intrusive cylinder pressure sensors.

Control module, module, control, controller, control unit, processor and similar terms mean any one or various combinations of one or more of Application Specific Integrated Circuit(s) (ASIC), electronic circuit(s), central processing unit(s) (e.g., microprocessor(s)), and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any controller executable instruction sets including calibrations and look-up tables. The ECU may be designed with a set of control routines executed to provide the desired functions. Control routines are executed, such as by a central processing unit, and are operable to monitor inputs from sensing devices and other networked control modules, and execute control and diagnostic routines to control operation of devices and actuators. Routines may be executed at regular intervals, for example each 100 microseconds, 3.125, 6.25, 12.5, 25 and 100 milliseconds during ongoing engine and vehicle operation. Alternatively, routines may be executed in response to occurrence of an event.

Figure 2:
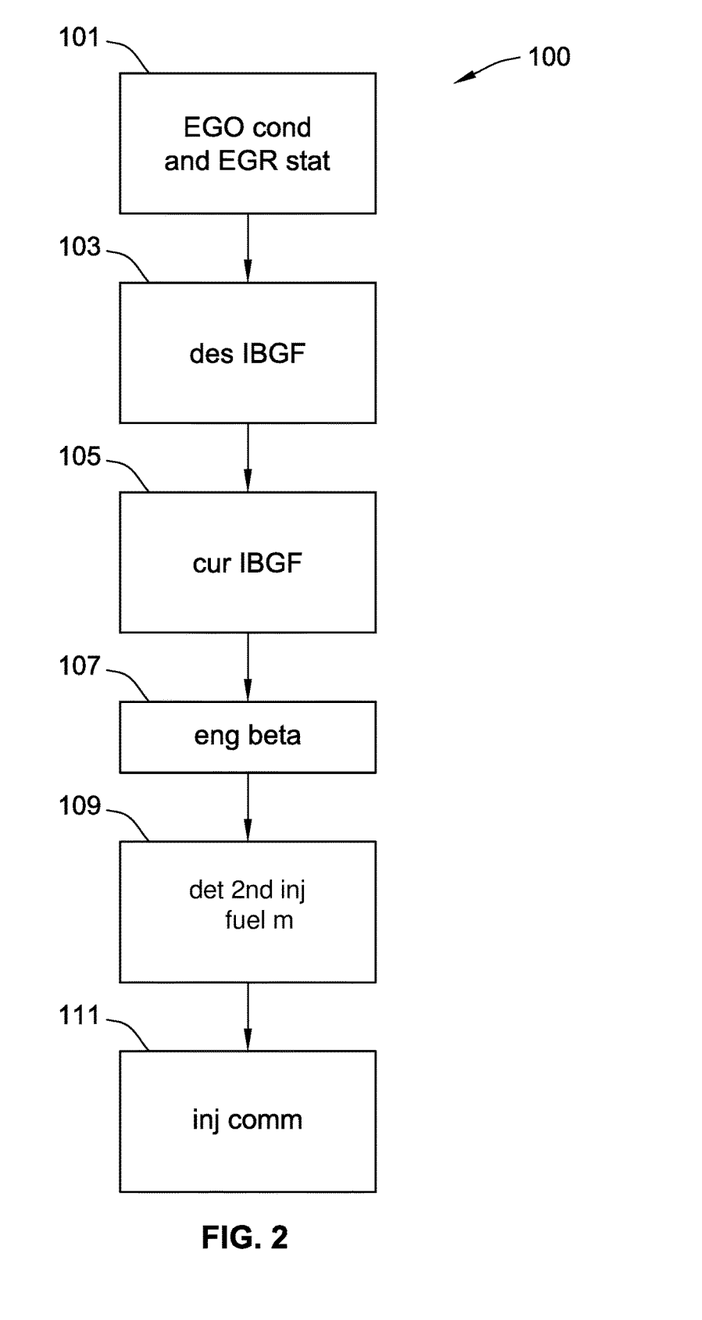
FIG. 2 is a flowchart for a multi-pulse fuel delivery control scheme or engine operation algorithm that corresponds to instructions executed by onboard control-logic circuitry of a motor vehicle in accord with aspects of the disclosed concepts.

With reference now to the flow chart of FIG. 2, an improved method or control strategy for operating a multi-pulse fuel delivery control system during operation of an internal combustion engine, such as ICE assembly 12 of FIG. 1, for a motor vehicle, such as the automobile 10, for example, is generally described at 100 in accordance with aspects of the present disclosure. FIG. 2 may be representative of an algorithm that corresponds to at least some instructions that may be stored, for example, in main or auxiliary memory, and executed, for example, by an ECU, CPU, an on-board or remote vehicle control logic circuit, or other device, to perform any or all of the above or below described functions associated with the disclosed concepts.

The method 100 of FIG. 2 starts at block 101 with monitoring, in real-time, the current engine operating conditions and the current EGR status of the engine, for example, during a transient engine operation (e.g., acceleration and deceleration). Using the vehicle 10 and engine assembly 12 of FIG. 1 as a point of reference, the ECU 5 may receive data from one or more sensing devices, such as the combustion sensor 30, crank sensor 42, and/or exhaust gas sensor 40, to determine the current engine speed, the current engine load, the current engine acceleration, the current engine ringing index, EGR demand, exhaust gas temperature, AFR, or any combination thereof, measured in real-time. By way of non-limiting example, the engine and EGR sensors may be in the nature of an intake O2 sensor, a Wide Range Air Fuel (WRAF) sensor, a fuel charge temperature sensor, or an embedded engine acoustic sensor, as well as other now known and hereinafter developed sensing devices and virtual sensing features operable for determining any engine operating variables and EGR variables relevant hereto.

At block 103, the method 100 determines a "desired" intake burned gas fraction from one or more or the signals received from the engine sensor indicative of a current engine operating condition. According to the illustrated example, the ECU 5 communicates with an onboard or remote memory device, which stores one or more lookup charts with desired intake burned gas fraction for each of a series of engine operating conditions. In an example, a lookup chart will have a respective burned gas fraction value for each of a sequence of engine speeds or engine accelerations. During variable second injection control, the ECU 5 may identify a desired intake burned gas fraction value for a given operating condition by referencing the appropriate lookup chart stored by the memory device. In this regard, one lookup chart may provide desired intake burned gas fractions for a series of engine speeds, another lookup chart may provide desired intake burned gas fractions for a series of engine loads, yet another lookup chart may provide desired intake burned gas fractions for a series of engine accelerations, and yet another lookup chart may provide desired intake burned gas fractions for a series of engine combustion noise levels.

Method 100 continues to block 105 to determine a current intake burned gas fraction, e.g., from one or more EGR sensor signals indicative of the current EGR state. Current intake burned gas fraction may be typified as the ratio of burned gas mass to the total fluid mass—sum of air mass and fuel mass and recirculated exhaust mass—for a single cylinder or for each of multiple/all cylinders 15 of the ICE assembly 12. Based on real-time measurements, calculated burned gas fraction for an internal combustion engine may be an indicator of combustion phasing, rate of heat release, charge dilution, or other metrics used in the control of an internal combustion engine. There are alternative methods to calculate burned gas fraction in an internal combustion engine. By way of non-limiting example, optional methods for determining intake burned gas fraction are provided in U.S. Pat. Nos. 7,128,063 and 7,735,478, both of which are incorporated herein by reference in their respective entireties and for all purposes. For instance, the EGR sensor may be operable to measure, in real-time, a ratio of oxygen mass to total fluid mass in at least one of the cylinders 15 of the ICE assembly 12, and current intake burned gas fraction is calculated from the measured ratio. In this particular arrangement, the EGR sensor may be a Wide Range Air Fuel (WRAF) sensor, an Air/Fuel (A/F) sensor, or a linear oxygen (O2) sensor, as some optional configurations.

With continuing reference to FIG. 2, block 107 requires determining an engine beta parameter ($\beta$) for the particular ICE assembly being subjected to the variable second injection control strategy 100. For at least some embodiments, the engine beta parameter is determined based on prior experimental results, such as running a particular engine assembly type on a dynamometer, plotting engine noise versus fuel efficiency penalty for increasing second injection fuel mass, and finding the optimal second injection fuel mass. Other options include determining the engine beta parameter based on engine type, current acceleration, or a desired noise profile, or any combination thereof, of the ICE assembly.

At block 109, method 100 determines a secondary fuel mass injection adjustment ($\Delta Fuel\_2^{nd}$) based on the product of beta and a difference between the desired intake burned gas fraction and the current intake burned gas fraction. For instance, secondary fuel mass may be calculated as follows:

$$\Delta Fuel\_2^{nd}=\max(\min(\beta(f_i^d-f_i),F_{max\_2nd}),0)$$

where $\beta$ is the engine beta parameter, $f_i^d$ is the desired intake burned gas fraction, and $f_i$ is the current intake burned gas fraction. While this implies that second injection fuel mass be determined based on real-time EGR and engine information, the adjustment may be bounded by a designated threshold, including zero. As shown, $\Delta Fuel\_2^{nd}$ is constrained by a predetermined maximum fuel mass injection for the second pulse ($F_{max\_2nd}$). Generally speaking, $F_{max\_2nd}$ and should not be bigger than a desired fuel intake ($F_{des}$). A maximum bound operates as a tuning parameter, e.g., as a function of engine operating conditions.

Method 100 of FIG. 2 thereafter proceeds to block 111 and commands each fuel injector, such as high-pressure fuel injectors 28 of FIG. 1, to inject a series of fuel pulses into its respective cylinder, per working cycle, with at least the second fuel pulse being modified by the calculated secondary fuel mass injection adjustment. When cylinder charge is determined to be too hot, the second injection may be modulated to cool down the cylinder charge, thereby slowing down auto-ignition and, thus, reducing combustion noise. Conversely, when cylinder charge is not sufficiently hot, which may result in sporadic auto-ignition, the second injection may be modulated to stabilize combustion by initiating spark-assisted auto-ignition. It is desirable, for at least some applications, that the amount of second injection be determined for the best fuel economy and emissions. During transient operations, the amount of second injection may be temporarily adjusted to improve combustion stability/noise depending on current operating conditions.

Figure 3:
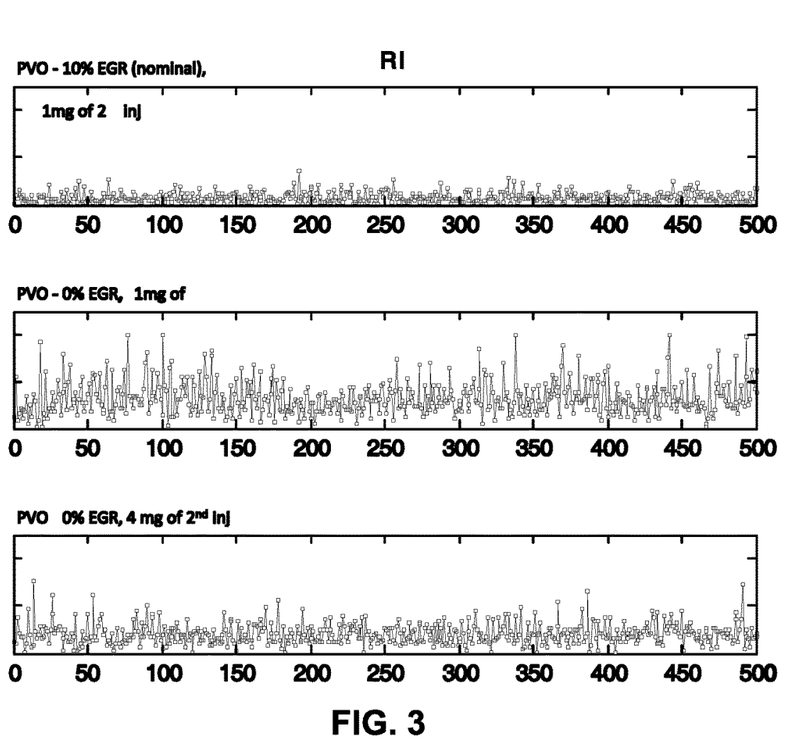
FIG. 3 is a series of graphs illustrating ringing index (RI) as a measure of engine combustion noise and the noise-attenuating effects of variable second injection control in accordance with aspects of the present disclosure.

FIG. 3 presents a series of graphs illustrating ringing index (RI), as a measure of engine combustion noise, during various engine operating conditions to help demonstrate the noise-attenuating effects of variable second injection control in accordance with aspects of the present disclosure. The first, top-most plot of FIG. 3A shows ringing index with a nominal operating condition. In the nominal operating condition, the desired level of EGR is achieved such that RI is below target level (shown with a dashed line). The second, middle plot shows ringing index when EGR is zero, which shows that sufficient EGR is not achieved during transient operation. In this instance, the level of RI is too high such that combustion noise is significant. The third, bottom plot of FIG. 3A shows ringing index when EGR is zero, but with second variable injection control as described herein. Even though there is not sufficient EGR, the level of ringing index is still acceptable, e.g., at or below established target levels.

Figure 4:
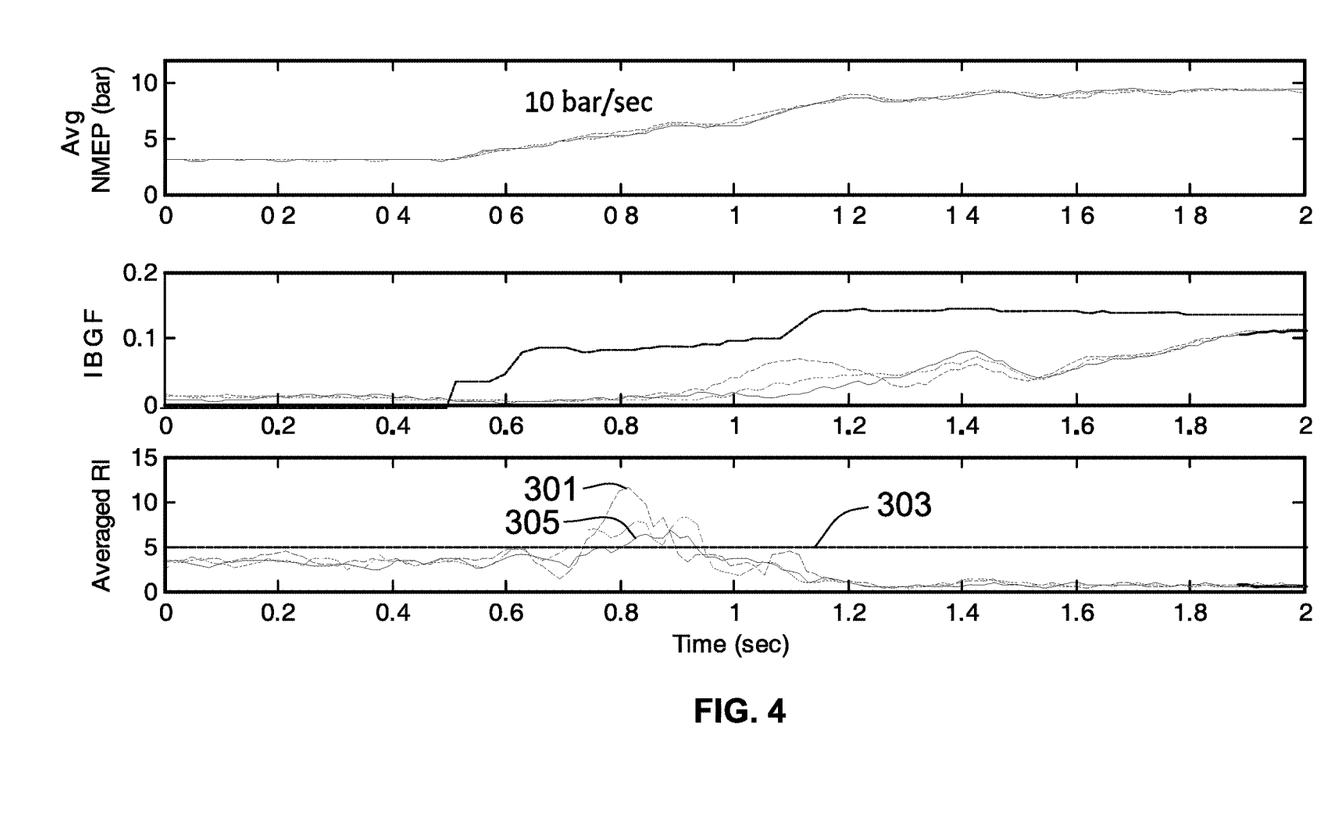
FIG. 4 is a series of graphs illustrating transient engine response with and without variable second injection control in accordance with aspects of the present disclosure.

FIG. 4 presents a series of graphs that help to illustrate transient engine response with and without variable second injection control in accordance with aspects of the present disclosure. Ringing index labelled at 301 is the transient performance without second variable injection, which shows the ringing index is above a target level 303. On the other hand, when variable second injection control is applied, ringing index 305 is typically below target level 303 even when there is not sufficient EGR.

Aspects of this disclosure may be implemented, in some embodiments, through a computer-executable program of instructions, such as program modules, generally referred to as software applications or application programs executed by an on-board vehicle computer. The software may include, in non-limiting examples, routines, programs, objects, components, and data structures that perform particular tasks or implement particular abstract data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by remote-processing devices that are linked through a communications network. In a distributed-computing environment, program modules may be located in both local and remote computer-storage media including memory storage devices. Aspects of the present disclosure may therefore, be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, or method disclosed herein may be embodied in software stored on a tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well-known manner (e.g., it may be implemented by an application specific integrated circuit (ASIC), a programmable logic device (PLD), a field programmable logic device (FPLD), discrete logic, etc.). Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

While aspects of the present disclosure have been described in detail with reference to the illustrated embodiments, those skilled in the art will recognize that many modifications may be made thereto without departing from the scope of the present disclosure. The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and subcombinations of the preceding elements and features.

What is claimed:

1. A multi-pulse fuel delivery control system for an internal combustion engine (ICE) assembly, the ICE assembly including an exhaust gas recirculation (EGR) system and a plurality of cylinders each with a respective piston, the fuel delivery control system comprising:
    a plurality of fuel injectors configured to fluidly couple to the ICE assembly, each of the fuel injectors being operable, when activated, to inject multiple pulses of fuel per working cycle into one of the cylinders of the ICE assembly;
    an engine sensor configured to detect a current engine operating condition of the ICE assembly and output a signal indicative thereof;
    an EGR sensor configured to detect a current EGR state of the EGR system and output a signal indicative thereof; and
    a programmable engine control unit communicatively connected to the fuel injectors, the EGR sensor, and the engine sensor, the engine control unit being configured to:
        determine, from the signal received from the EGR sensor indicative of the current EGR state, a current intake burned gas fraction;
        determine, from the signal received from the engine sensor indicative of the current engine operating condition, a desired intake burned gas fraction;
        determine an engine beta parameter for the ICE assembly;
        determine $X=(\beta(f_i^d-f_i))$, where $\beta$ is the engine beta parameter, $f_i^d$ is the desired intake burned gas fraction, and $f_i$ is the current intake burned gas fraction;
        determine a secondary fuel mass injection adjustment based on the engine beta parameter $\beta$, $X$, and a difference between the desired intake burned gas fraction $f_i^d$ and the current intake burned gas fraction $f_i$; and
        command each of the fuel injectors to inject first and second fuel pulses into the respective cylinder per working cycle with the second fuel pulse modified based on the secondary fuel mass injection adjustment.

2. The fuel delivery control system of claim 1, wherein the current intake burned gas fraction is a measured ratio of burned gas mass to total fluid mass in at least one of the cylinders of the ICE assembly.

3. The fuel delivery control system of claim 1, wherein the current engine operating condition includes an engine speed, an engine load, an engine acceleration, a current engine ringing index, or any combination thereof, measured in real-time.

4. The fuel delivery control system of claim 3, wherein the engine sensor is an intake O2 sensor, a Wide Range Air Fuel (WRAF) sensor, a fuel charge temperature sensor, or an embedded engine acoustic sensor.

5. The fuel delivery control system of claim 1, further comprising a memory device communicatively connected to the engine control unit and storing a lookup chart with a respective desired intake burned gas fraction for each of plural engine operating conditions, wherein the engine control unit determines the desired intake burned gas fraction by referencing the lookup chart stored by the memory device.

6. The fuel delivery control system of claim 5, wherein the plural engine operating conditions include a series of engine speeds, a series of engine loads, a series of engine accelerations, or a series of engine combustion noise levels, or any combination thereof.

7. The fuel delivery control system of claim 1, wherein the engine beta parameter is determined based on an engine type, a current acceleration, or a desired noise profile, or any combination thereof, of the ICE assembly.

8. The fuel delivery control system of claim 1, wherein the EGR sensor is a Wide Range Air Fuel (WRAF) sensor, an Air/Fuel (A/F) sensor, a linear oxygen (O2) sensor, a virtual sensor, or any combination thereof.

9. A multi-pulse fuel delivery control system for an internal combustion engine (ICE) assembly, the ICE assembly including an exhaust gas recirculation (EGR) system and a plurality of cylinders each with a respective piston, the fuel delivery control system comprising:
  a plurality of fuel injectors configured to fluidly couple to the ICE assembly, the fuel injectors each being operable, when activated, to inject multiple pulses of fuel per working cycle into one of the cylinders of the ICE assembly;
  an engine sensor configured to detect a current engine operating condition of the ICE assembly and output a signal indicative thereof;
  an EGR sensor operable to measure, in real-time, a ratio of oxygen mass to total fluid mass in at least one of the cylinders of the ICE assembly and output a signal indicative thereof; and
  a programmable engine control unit communicatively connected to the fuel injectors, the EGR sensor, and the engine sensor, the engine control unit being configured to:
    determine, from the signal received from the EGR sensor, a current intake burned gas fraction, wherein the current intake burned gas fraction is determined from the measured ratio of oxygen mass to total fluid mass;
    determine, from the signal received from the engine sensor indicative of the current engine operating condition, a desired intake burned gas fraction;
    determine a secondary fuel mass injection adjustment based on a difference between the desired intake burned gas fraction and the current intake burned gas fraction; and
    command each of the fuel injectors to inject first and second fuel pulses into the respective cylinder per working cycle with the second fuel pulse modified based on the secondary fuel mass injection adjustment.

10. The fuel delivery control system of claim 9, wherein the engine control unit is further configured to determine an engine beta parameter for the ICE assembly, and wherein the secondary fuel mass injection adjustment is determined based on the engine beta parameter.

11. The fuel delivery control system of claim 10, wherein the engine control unit is further configured to determine:

$$X = (\beta(f_i^d - f_i))$$

where $\beta$ is the engine beta parameter, $f_i^d$ is the desired intake burned gas fraction, and $f_i$ is the current intake burned gas fraction, and wherein the secondary fuel mass injection adjustment is determined based on X.

12. The fuel delivery control system of claim 11, wherein the engine beta parameter is determined based on an engine type, a current acceleration, or a desired noise profile, or any combination thereof, of the ICE assembly.

13. The fuel delivery control system of claim 9, wherein the EGR sensor is a Wide Range Air Fuel (WRAF) sensor, an Air/Fuel (A/F) sensor, a linear oxygen (O2) sensor, a virtual sensor, or any combination thereof.

14. The fuel delivery control system of claim 9, wherein the current engine operating condition includes an engine speed, an engine load, an engine acceleration, a current engine ringing index, or any combination thereof, measured in real-time.

15. A multi-pulse fuel delivery control system for an internal combustion engine (ICE) assembly, the ICE assembly including an exhaust gas recirculation (EGR) system and a plurality of cylinders each with a respective piston, the fuel delivery control system comprising:
  a plurality of fuel injectors configured to fluidly couple to the ICE assembly, each of the fuel injectors being operable, when activated, to inject multiple pulses of fuel per working cycle into one of the cylinders of the ICE assembly;
  an engine sensor configured to detect a current engine operating condition of the ICE assembly and output a signal indicative thereof;
  an EGR sensor configured to detect a current EGR state of the EGR system and output a signal indicative thereof; and
  a programmable engine control unit communicatively connected to the fuel injectors, the EGR sensor, and the engine sensor, wherein the engine control unit is configured to:
    determine, from the signal received from the EGR sensor indicative of the current EGR state, a current intake burned gas fraction;
    determine, from the signal received from the engine sensor indicative of the current engine operating condition, a desired intake burned gas fraction;
    determine:

$$Y = \min(F_{max\_2nd}, 0)$$

where $F_{max\_2nd}$ is a maximum fuel mass injection for the second pulse;
    determine a secondary fuel mass injection adjustment based on Y and a difference between the desired intake burned gas fraction and the current intake burned gas fraction; and
    command each of the fuel injectors to inject first and second fuel pulses into the respective cylinder per working cycle with the second fuel pulse modified based on the secondary fuel mass injection adjustment.

16. The fuel delivery control system of claim 15, wherein the current engine operating condition includes an engine speed, an engine load, an engine acceleration, a current engine ringing index, or any combination thereof, measured in real-time.

17. The fuel delivery control system of claim 15, wherein the EGR sensor is a Wide Range Air Fuel (WRAF) sensor, an Air/Fuel (A/F) sensor, a linear oxygen (O2) sensor, a virtual sensor, or any combination thereof.

18. The fuel delivery control system of claim 15, wherein the current intake burned gas fraction is a measured ratio of burned gas mass to total fluid mass in at least one of the cylinders of the ICE assembly.

19. The fuel delivery control system of claim 15, wherein the engine control unit is further configured to determine an engine beta parameter for the ICE assembly, and wherein the secondary fuel mass injection adjustment is determined based on the engine beta parameter.

20. The fuel delivery control system of claim 19, wherein the engine beta parameter is determined based on an engine type, a current acceleration, or a desired noise profile, or any combination thereof, of the ICE assembly.

* * * * *